Oct. 12, 1926.
J. J. McELROY
AIR SPRING
Filed March 27, 1923
1,602,538
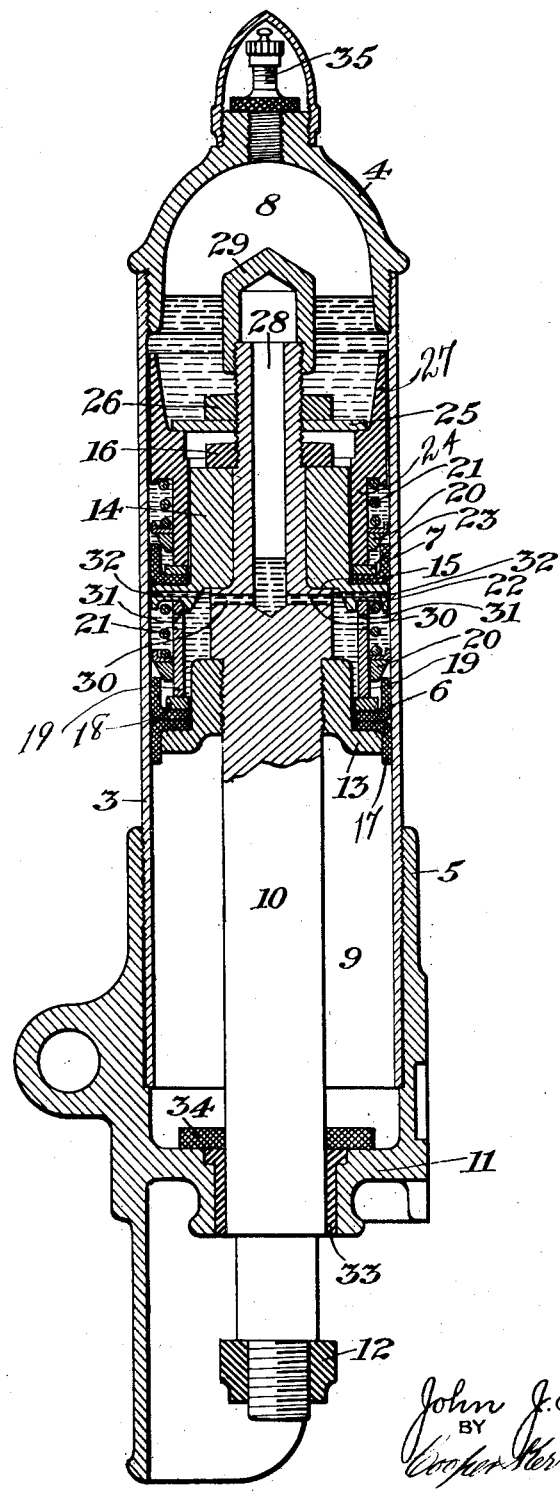
INVENTOR
John J. McElroy
BY
Cooper, Kerr & Dunham
HIS ATTORNEYS Patented Oct. 12, 1926.

1,602,538

UNITED STATES PATENT OFFICE.

JOHN J. McELROY, OF NEW HAVEN, CONNECTICUT, ASSIGNOR TO THE WESTINGHOUSE AIR SPRING COMPANY, OF NEW HAVEN, CONNECTICUT, A CORPORATION OF PENNSYLVANIA.

AIR SPRING

Application filed March 27, 1923. Serial No. 628,087.

This invention relates to pneumatic cushion devices and methods of operating the same, useful in the arts generally, and particularly in connection with vehicles and the like.

One object of the present invention is to provide a device comprising essentially a cylinder with a closed top divided by a piston having a sliding fit therein; the space above the piston being the main cushion chamber containing air usually under pressure and a suitable quantity of oil to serve as an oil seal for preventing air leakage; and the space below the piston containing atmospheric air admitted thereinto through the leaky mechanical seal or packing between the piston rod and the bottom wall of the cylinder, the chamber thus provided at the lower end of the cylinder serving to gradually check the recoil or rebound of the piston.

Another object is the provision in such a structure of means for collecting oil leaking past the seal and restoring it to the chamber above the seal at appropriate periods in the operation of the device.

Another object is the provision of means in the collecting chamber for positively causing the return of the stored oil to the cushion chamber, said last named means being brought into operation at appropriate times by and during the operation of the spring members, whereby the life of the spring is prolonged indefinitely.

Another object is the provision of means in said device for confining the atmospheric air to the lower chamber, thus preventing or restraining the passage thereof into the collecting chamber or the cushion chamber.

Other objects and features of novelty are pointed out hereinafter and in the appended claims.

In the accompanying drawing I have shown by way of illustration a sectional elevation of one form of pneumatic spring embodying my new method and apparatus for operating such devices.

The device consists of a suitable length of tubing 3, to the upper end of which a dome shaped head 4 is threaded, and to the lower end of which a cup-shaped casting 5 is threaded.

A piston or plunger carrying two annular cup-shaped packings 6 and 7 is arranged to slide within tubing 3 and divides the interior of the air spring into a variable volume load supporting cushion chamber 8 and a rebound or recoil check chamber 9.

A piston rod 10 carries the piston or plunger and projects through the bottom 11 of the air spring and is connected by nut 12 to the outer end of a leaf spring of a vehicle, while cup-shaped member 5 is suitably connected to a front horn or a leaf spring attached to the vehicle frame, as is now well understood in the art.

The piston of the air spring preferably consists of a lower annular nut or base 13 threaded onto the piston rod 10 and an upper annular nut or follower 14 threaded onto the upper end of the piston rod 10 or held in place against a shoulder 15 thereon by a threaded nut 16.

These two nuts 13 and 14 form supports for the cup packings 6 and 7 and their outer peripheries are preferably finished so as to form bearing surfaces adapted to slide on the inner surfaces of cylinder 3. In the event it is desired to utilize a cup shaped packing 17 facing into the chamber 9 to insure that no air leaks past the cup packing 6 from said chamber, the outer periphery of the nut 13 will be cut away a sufficient distance to permit the interposition of the cup shaped packing 17 between said nut and the wall of cylinder 3. Packing 6, or packings 6 and 17, as the case may be, are held in place on nut 13 by means of an annular washer 18 and a tubular retainer 19 which is held in place by cylindrical nut 14. The free edge of each of the cup shaped packings 6 and 7 is pressed against the inner wall of cylinder 3 by means of cone expanders 20, and helical springs 21. Cup shaped packing 7 is held in place on annular flange 22 of annular nut 14 by means of an annular washer 23 and nut or follower 24 which, in turn, is held in place by nut 25 and lock nut 26 at the top of piston rod 10. The nut or follower 24 is formed with a relatively long cylindrical bearing surface 27.

Piston rod 10 from a point midway between the cup packings 6 and 7 is drilled to the top thereof to form an air chamber 28 and a screw threaded cap 29 is provided at the top and hermetically closing off the chamber 28 at this point. Oil ducts 30, 30, extend from the bottom of the chamber 28 and open into the space between the said cup packings 6 and 7. The retainer 19 is provided with a number of oil holes 31, 31, near its upper edge and the space between the cup packings 6 and 7 serves as an oil retaining chamber for maintaining a constant oil seal for the free edge of cup packing 6. Oil ducts 32, 32, are provided in the bottom of nut 14 permitting ready passage of oil between the wall 3 and the space between the cup packings 6 and 7.

A flanged bushing 33 formed from suitable bearing metal is placed within the central opening of bottom member 11 and serves as a bearing for the piston rod 10. An annular buffer 34 formed of some suitable soft material loosely surrounds piston rod 10 and rests on the bottom of chamber 9. This buffer or washer 34 may be of a soft felt wick washer saturated with oil and serve to insure lubrication of the piston rod at this point and to absorb any oil that may leak down from the top and hold it for the lubrication of the rod 10 in the bearing 33.

Normally, the cushion chamber 8 will be filled with oil to approximately the level shown in the drawings, the oil filling the spaces between the cup packings 6 and 7.

The act of filling the chamber 8 with oil preparatory to putting the device into service traps and confines a quantity of air or other elastic fluid in the chamber 28 and I make use of this chambered air or other elastic fluid in the operation of the device to aid and assist in maintaining a liquid seal between the lower extremity of the piston and the rebound chamber 9 and to keep the oil circulating to the bearing surfaces through the space above the cup washer 6.

It will be understood that the device will be initially charged with the required amount of air under pressure through a check valve conventionally shown at 35 and the air pumped will flow into the cushion chamber 8 of the device and be confined there, as is now well understood in the art.

In the operation of the device, with the embodiment of the invention as shown in the drawing, if no oil is forced past the cup washer 7, there will be no change in the level of the oil in chamber 28 and consequently no increase in the degree of compression of the air therein. On the other hand, should oil leak past, or be forced past, the cup washer 7, it will raise the level of the liquid in the chamber 28 and consequently no increase in the degree of compression of the air therein. On the other hand, should oil leak past, or be forced past, the cup washer 7, it will raise the level of the liquid in the chamber 28 and increase the degree of compression of the air therein and successive leakages of this character will build up a pressure in the chamber 28 and consequently place all the oil above the cup washer 6 under increased pressure until the pressure exerted by the air confined in chamber 28 equals or exceeds a minimum pressure in the cushion chamber 8, at which time the excess liquid will be transferred to a point above the cup washer 7. For example, with a pressure in the chamber 8 of, say, 70 to 90 pounds per square inch for normal standing load, the pressure under working conditions varies therein from 150 to 200 pounds per square inch on the up stroke of the piston to 30 to 35 pounds per square inch on the down stroke thereof. From the foregoing, it will be seen that I make use of the pumping action of the air spring to force the oil escaping from the air chamber 8 into another chamber and gradually build up a pressure therein which will exceed a minimum pressure of said chamber 8 and also avail myself of the pumping action of the chamber 8 at the minimum operating pressures below that built up in the auxiliary chamber 28 to positively draw the excess of oil from the said chamber 28 back into the chamber 8, at appropriate times during the operation of the device.

Should the cup washer 7, for any reason, break down while the spring is in use, the air chamber 28 will then take the rapid variations of pressures more or less direct and serve to protect the cup washer 6 from the deleterious effects of such rapid pressure variations and the consequent pumping action exerted on the chamber 28 by the pressure variations in chamber 8 will continue to serve to circulate the oil above cup washer 6, as the unimpaired portion of the cup washer 7 will continue to act as a seal between the chamber 8 and the space above the cup washer 6, to all bearing parts of the piston, and the device will continue to work efficiently.

The construction above described for returning the escaped oil to the cushion chamber 8 has marked advantages in view of the fact that it has no moving parts to get out of order and, further, the transfer of the oil is automatically accomplished only at those times when oil has accumulated.

Furthermore, it will be apparent that the oil betwen the long bearing 27 and the wall 3 in cushion chamber 8 is under pressure at all times, and I have discovered that by the employment of this arrangement, the device operates more smoothly and is more steady than similar devices in which such a bearing is absent.

I claim as my invention:

1. An elastic fluid spring comprising in combination, two chambers, a piston, one of said chambers being of varying volume as said piston reciprocates and the other of substantially constant volume, and means forming a liquid seal between said chambers.

2. An elastic fluid spring comprising in combination, a cylinder, a piston in said cylinder, a chamber for elastic fluid on one side of said piston, a chamber for elastic fluid carried by said piston, and means forming a liquid seal between said chambers.

3. In a vehicle spring, a cylinder, a piston closing off a portion of said cylinder for a cushion chamber, a packing for the joint between said piston and cylinder, and a liquid collecting chamber having a trapped elastic fluid compartment on the low pressure side of said packing for transferring liquid to the opposite side of said packing.

4. In a vehicle spring, a cylinder, a piston dividing the cylinder into a cushion chamber on one side and a rebound check chamber on the other side, a packing for the joint between said piston and cylinder, and a liquid collecting chamber having a trapped elastic fluid compartment on the low pressure side of said packing.

5. In a vehicle spring, a cylinder, a piston closing off a portion of said cylinder for a cushion chamber, successive packings for the joint between said piston and cylinder, and a trapped elastic fluid compartment communicating with the space between said packings for transferring liquid to the cushion chamber.

6. In a vehicle spring, a cylinder, a piston closing off an air-tight cushion chamber in said cylinder, successive packings for the joint between said piston and said cylinder, and an oil receiving chamber having a trapped elastic fluid compartment in the space between said packings for transferring liquid to the cushion chamber.

7. In a vehicle spring, a cylinder, a piston closing off an air-tight cushion chamber in said cylinder, and a trapped elastic fluid compartment in said piston for transferring liquid to said cushion chamber.

8. In a vehicle spring, a cylinder, a piston closing off an air-tight cushion chamber in said cylinder, successive packings for the joint between said piston and said cylinder, and an oil receiving chamber having a trapped elastic fluid compartment in the space between said packings, and having an oppositely directed packing on the bottom of said compartment.

9. In a vehicle spring, a cylinder, a piston closing off an air-tight cushion chamber in said cylinder, and a trapped elastic fluid in a compartment of substantially constant volume in said piston for exerting pressure against liquid entering said compartment.

10. In a vehicle spring, a cylinder, a piston, closing off an air tight cushion chamber in said cylinder, and a trapped elastic fluid compartment of substantially constant volume in said piston and extending above the piston into said chamber.

11. In a vehicle spring, a cylinder, a piston closing off a portion of said cylinder for a cushion chamber, successive packings for the joint between the piston and cylinder, and a trapped elastic fluid compartment communicating with the space between said packings and extending above said piston and into said chamber.

In testimony whereof I hereto affix my signature.

JOHN J. McELROY.